United States Patent
Miu et al.

(10) Patent No.: US 9,002,504 B2
(45) Date of Patent: Apr. 7, 2015

(54) METHOD OF WAFER SYSTEM INTERLOCK FOR THE PROTECTION OF EQUIPMENT AND PRODUCT IN SEMICONDUCTOR PROCESSING BRIDGE TOOL

(71) Applicant: Kawasaki Robotics (USA), Inc., Wixom, MI (US)

(72) Inventors: Thomas Miu, Fremont, CA (US); Shinya Kitano, San Jose, CA (US); Simon Jeyapalan, Sunnyvale, CA (US); Ming Zeng, San Jose, CA (US); Avish A. Bharwani, Santa Clara, CA (US)

(73) Assignee: Kawasaki Robotics (USA) Inc., Wixom, MI (US)

( * ) Notice: Subject to any disclaimer, the term of this patent is extended or adjusted under 35 U.S.C. 154(b) by 206 days.

(21) Appl. No.: 13/797,460

(22) Filed: Mar. 12, 2013

(65) Prior Publication Data

US 2014/0277727 A1    Sep. 18, 2014

(51) Int. Cl.
| | |
|---|---|
| *G06F 7/00* | (2006.01) |
| *G06F 19/00* | (2011.01) |
| *G05B 19/04* | (2006.01) |
| *B25J 9/16* | (2006.01) |

(52) U.S. Cl.
CPC .. *B25J 9/16* (2013.01); *Y10S 901/02* (2013.01)

(58) Field of Classification Search
None
See application file for complete search history.

(56) References Cited

U.S. PATENT DOCUMENTS

| | | | |
|---|---|---|---|
| 2005/0053004 A1* | 3/2005 | Cain et al. | 370/235 |
| 2014/0235141 A1* | 8/2014 | Maloney et al. | 451/5 |

* cited by examiner

*Primary Examiner* — Yolanda Cumbess
(74) *Attorney, Agent, or Firm* — Alleman Hall McCoy Russell & Tuttle LLP

(57) ABSTRACT

The present disclosure is directed to methods and systems for evaluating wafer size handling capabilities of wafer handling robots and wafer stations in a wafer processing environment. In one embodiment, a method is provided in which size parameters for each of one or more wafer stations and one or more robot hands of a wafer handling robot are set based on user input. A user command identifying a desired robot hand and a desired wafer station is received. A first size parameter of the desired robot hand is compared to a second size parameter of the desired wafer station. If the first size parameter is equal to the second size parameter, or if the second size parameter is an all-size parameter, the user command is executed. If the first size parameter is not equal to the second size parameter, an error is generated.

22 Claims, 8 Drawing Sheets

|  | Hand | | |
|---|---|---|---|
| Wafer Size | 0 (All-size) | 300 | 450 |
| 0 (All-size) | Y | Y | Y |
| 300 | Y | Y | N |
| 450 | Y | N | Y |

FIG. 8

METHOD OF WAFER SYSTEM INTERLOCK FOR THE PROTECTION OF EQUIPMENT AND PRODUCT IN SEMICONDUCTOR PROCESSING BRIDGE TOOL

BACKGROUND

The fabrication of semiconducting wafers is a complex process carried out, for example, to create substrates for integrated circuits and other electronics. A typical wafer manufacturing process may involve a lame number of steps, including routine transfer of wafers from station to station. For example, a robot may transfer a wafer via one or more hands from a source station holding a plurality of wafers to an aligner station configured to determine the rotational orientation of wafers. The robot may receive instructions governing its operation from a user, which may comprise commands instructing the robot to obtain/place a wafer and associated parameters specifying the source/destination and hand to grip the wafer.

Implementation of a wafer process in which multiple wafer sizes are handled is less straightforward. For example, some stations and robot hands may handle only one wafer size, requiring instructions issued to the robot to specify correct parameters respecting the handling capabilities of the wafer process. Issuance of instructions with incorrect parameters may cause errors and even damage to components in the wafer process.

SUMMARY

The present disclosure is directed to methods and systems for evaluating wafer size handling capabilities of wafer handling robots and wafer stations in a wafer environment. In one embodiment, a method is provided in which size parameters for each of one or more wafer stations and one or more robot hands of one or more wafer handling robots are set based on user input. A user command identifying a desired hand and a desired wafer station is received. A first size parameter of the desired hand is compared to a second size parameter of the desired wafer station. If the first size parameter is equal to the second size parameter, or if the second size parameter is an all-size parameter, the user command is executed. If the first size parameter is not equal to the second size parameter, an error is generated. In some embodiments, error output may be customized based on one or more parameters specified in the user command.

In this way, errors and/or damage resulting from specification of incompatible size parameters in a user command may be reduced or prevented. Further, customization of error output may expedite error resolution and reduce tool downtime.

BRIEF DESCRIPTION OF THE DRAWINGS

FIG. 8 schematically shows an exemplary truth table accessible by the controller of FIG. 5 in accordance with an embodiment of the present disclosure.

DETAILED DESCRIPTION

The present disclosure is directed to methods and systems for evaluating wafer size handling capabilities of wafer handling robots and wafer stations in a wafer environment. It will be appreciated, however, that the methods and systems described herein may be equally applied to other types of semiconductor substrate, such as a wafer mask, "Wafer" as used herein may also refer to such other types of semiconductor substrate. As described in more detail below, a method is provided in which size parameters for each of one or more wafer stations and one or more robot hands of one or more wafer handling robots are set based on user input. A user command identifying a desired hand and a desired wafer station is received. A first size parameter of the desired hand is compared to a second size parameter of the desired wafer station. If the first size parameter is equal to the second size parameter, or if the second size parameter is an all-size parameter, the user command is executed. If the first size parameter is not equal to the second size parameter, an error is generated.

Figure 1:
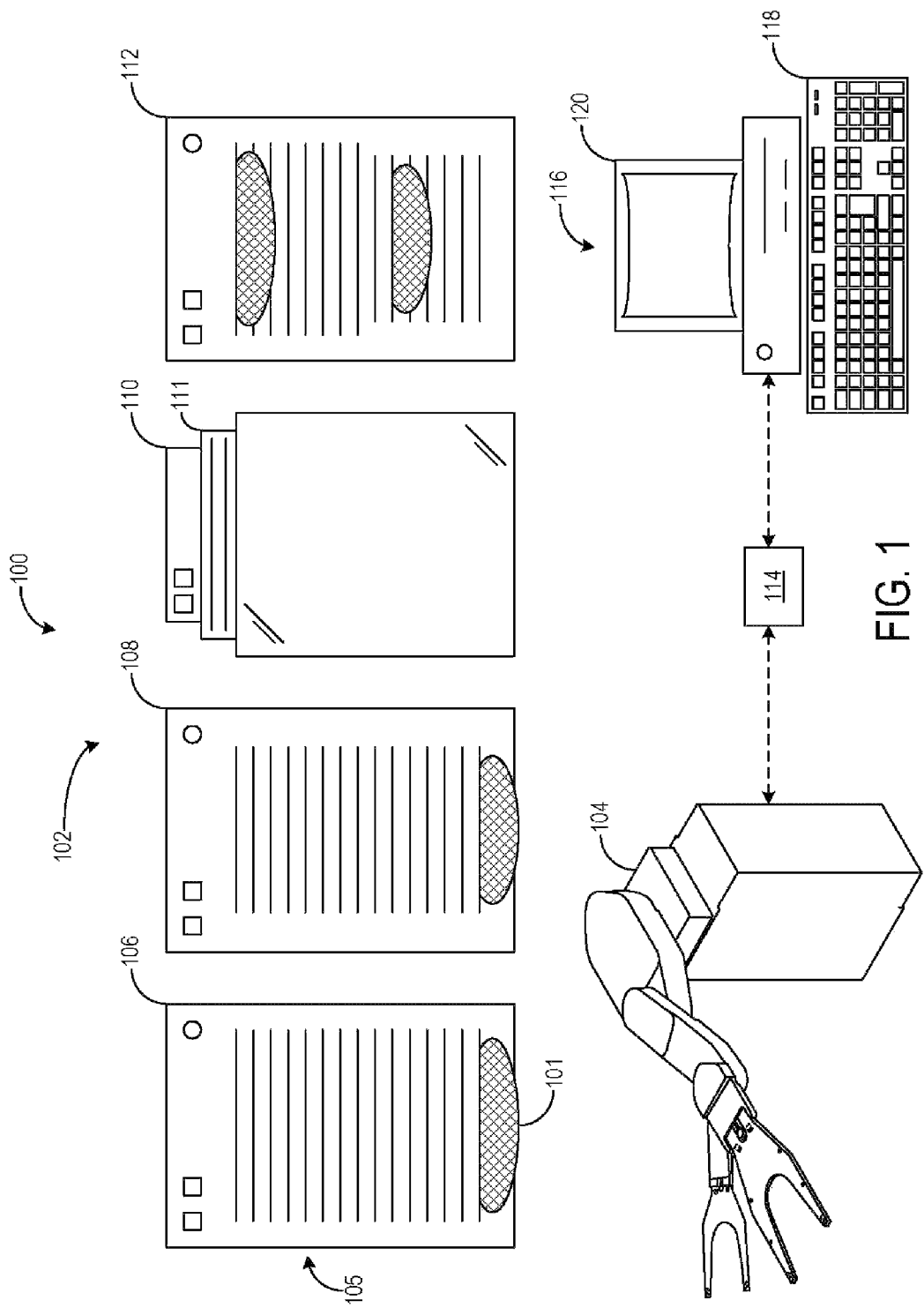
FIG. 1 schematically shows a wafer environment in accordance with an embodiment of the present disclosure.

FIG. 1 schematically shows a wafer environment 100 configured to facilitate the handling and processing of wafers (e.g., wafer 101). Virtually any suitable type of wafer may be handled and processed by environment 100, for example semiconductor wafers comprised of silicon or germanium. Such wafers may be used, for example, in the construction of electronic circuits such as microprocessors, microcontrollers, and application-specific integrated circuits (ASICs). Environment 100 may handle and process virtually any number of wafer sizes and shapes including circular wafers having 75, 100, 125, 150, 200, 300, and 450 millimeter diameters. Environment 100 may further handle and process square photolithography masks of any size.

Wafer environment 100 includes a plurality of wafer stations 102, each configured to perform wafer-specific functions and handle one or more of the wafer sizes described above. It will be appreciated that the plurality of wafer stations 102 is provided as a non-limiting example and may illustrate a portion of a greater wafer manufacturing process. For example, the plurality of wafer stations 102 may generally illustrate etching, doping, material deposition, or photolithography stages of an overall wafer manufacturing process. More or fewer wafer stations may be provided and their functionalities and wafer sizes varied without departing from the scope of this disclosure, however. In general, wafer environment 100 is configured to move wafers via a wafer handling robot 104 from a first source station 106 and/or a second source station 108 to a processing station 110, and finally from the processing station 110 to a destination station 112, or back to first source station 106 or second source station 108. Upon reaching destination station 112, wafers may be moved by wafer handling robot 104 or another device to other locations not shown for further processing.

First source station 106 is configured to hold a plurality of wafers and may be the first station in the plurality of stations 102 to be utilized during a particular process run in wafer environment 100. First source station 106 may include a container such as front opening unified pod (FOUP) or cassette configured) to store a plurality of wafers (e.g., 25) and may store the wafers in a horizontal, vertical, or alternative orientation in slots 105. In this example, first source station 106 holds 450 millimeter wafers, though it may hold one or more additional sizes. First source station 106 may further include a sensor (not shown) for detecting the presence and/or number of wafers being held, and may also include a communication interface such as an RS-232 serial or Ethernet connection for providing information representative of its state.

The plurality of stations 102 similarly includes a second source station 108 configured to hold 300 millimeter wafers. Like first source station 106, second source station 108 may store a plurality of wafers in a FOUP or cassette, and may include a sensor for wafer detection and/or a communication interface. In this way, wafer environment 100 may handle and process wafers of more than one size.

The plurality of stations 102 further includes a processing station 110 configured to carry out one or more processing steps in a wafer manufacturing process. Processing station 110 may be, for example, an edge grip or vacuum aligner station configured to determine the orientation of a wafer received from first source station 106 and/or second source station 108. In this example, processing station 110 includes an aligner head 111 which is moved based on the size of the received wafer. If, for example, aligner head 111 is placed for a 300 mm wafer but is to receive a 450 mm wafer, aligner head 111 is moved radially outward from its center to accommodate the larger diameter of the 450 mm wafer. In some embodiments, aligner head 111 is moved to a position relative to the aligner station center corresponding to half the diameter of the wafer being handled (e.g., 150 mm for 300 mm wafers; 225 mm for 450 mm wafers). Movement of aligner head 111 may be prompted by any suitable means, including commands issued by a user described in further detail below, signals received from first and/or second source stations 106 and 108, and/or signals received from wafer handling robot 104. In some embodiments, aligner head 111 may be automatically moved based on the size of an inbound wafer prior to transfer of the wafer to processing station 110.

With aligner head 111 properly placed, processing station 110 rotates the received wafer until an orientation notch on the wafer is located. Wafers in environment 100 include orientation notches at their edge which may identify and orient the wafers relative to robot hands to thereby facilitate proper wafer handling and processing. Such wafers may include additional notches which identify, for example, their crystal type and/or conductivity. The received wafer may be rotated, for example, up to 360 degrees and its orientation notch may be detected by any suitable method. For example, processing station 110 may include a light source (not shown) configured to project light in a substantially perpendicular direction to the wafer surface at its edge. A detector (not shown) placed under the wafer and the light source may then detect light projected by the light source as it passes through the open region formed by the notch to thereby determine the wafer orientation. In some examples, the light source may be a light-emitting diode and the detector may be a charge-coupled device.

Once the orientation of the wafer is determined, the wafer is moved to destination station 112 via wafer handling robot 104. Like first source station 106, destination station 112 may store a plurality of wafers in a container such as a FOUP, cassette, or loadlock, and may include a sensor for wafer detection and/or a communication interface. However, in this example destination station 112 is configured to hold both wafers of 300 mm and 450 mm sizes. Destination station 112 may further carry out various processing steps of a wafer manufacturing process, or may simply stage wafers to be moved by wafer handling robot 104 or by another robot (not shown) for further processing.

Figure 2:
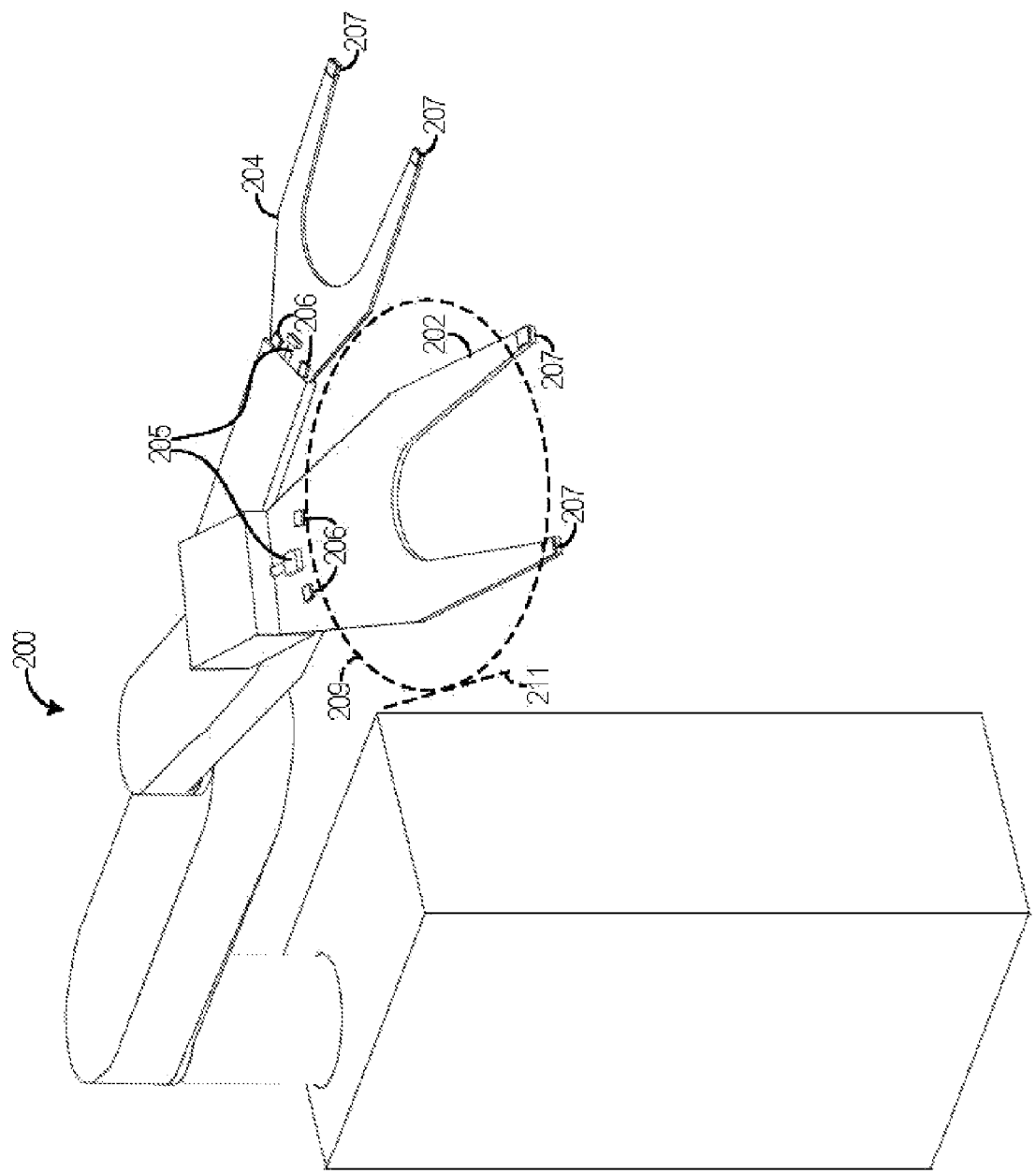
FIG. 2 shows an exemplary wafer handling robot in accordance with an embodiment of the present disclosure.
Figure 3:
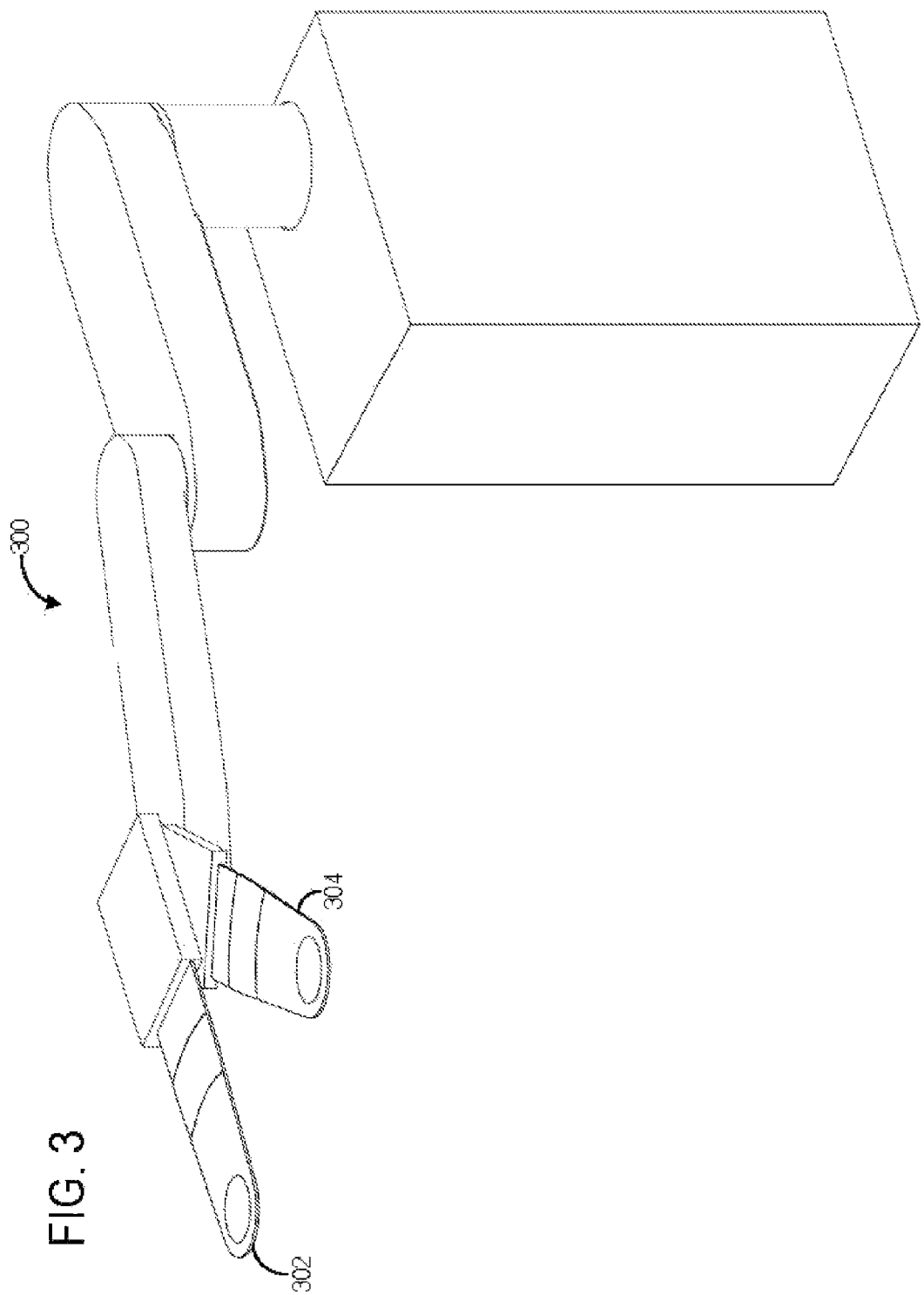
FIG. 3 shows a second exemplary wafer handling robot in accordance with an embodiment of the present disclosure.
Figure 4:
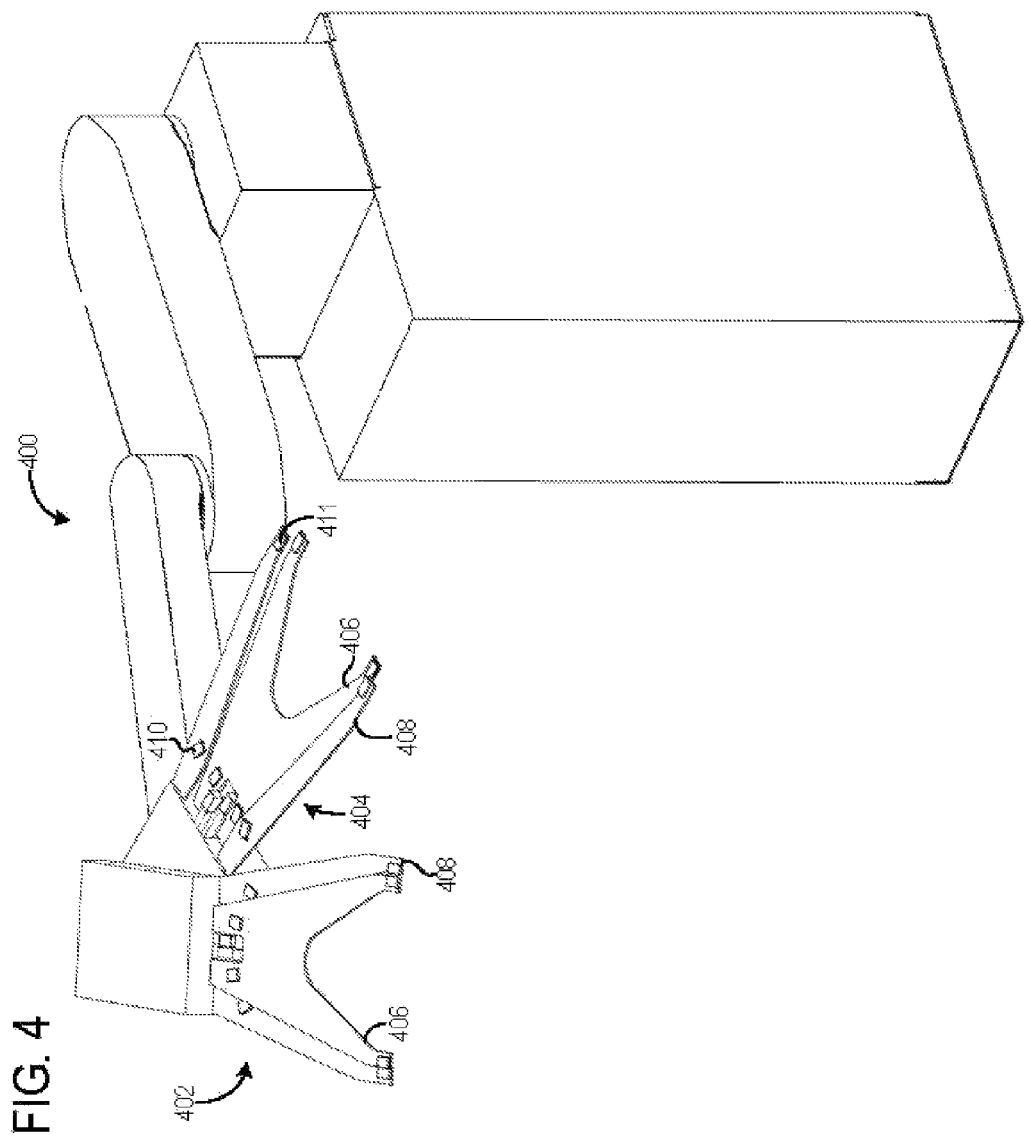
FIG. 4 shows a third exemplary wafer handling robot in accordance with an embodiment of the present disclosure.

As described above, wafer handling robot 104 moves wafers in environment 100 among the plurality of stations 102. FIGS. 2-4 illustrate various wafer handling robots in accordance with the present disclosure and particularly illustrate several means by which wafers may be gripped, handled, and moved.

Turning now to FIG. 2, an exemplary wafer handling robot 200 is shown. Robot 200 includes a first end effector 202 and a second end effector 204 each configured to grip and support a wafer with a pair of rear pads 206 and a pair of front pads 207. As used herein, the terms "end effector" and "hand" are equivalent. First end effector 202 is particularly adapted to handle 450 mm wafers while second end effector 204 is adapted to handle 300 mm. More particularly, first and second end effectors 202 and 204 include edge grippers 205 configured to push and grip the outer edge (i.e., circumference) of a wafer and push the wafer against front pads 207. One or both of first and second end effectors 202 and 204 may each further include a pocket 211, represented in the figure by dashed lines. Pocket 211 may be a substantially circular element configured to limit wafer movement, and have a circumference defined by edge gripper 205, front pads 207, and an external structure—for example, a boundary 211.

FIG. 3 shows another exemplary wafer handling robot 300 in accordance with an embodiment of the present disclosure. Robot 300 includes a first end effector 302 and a second end effector 304 adapted to handle both 300 mm and 450 mm wafers. Specifically, first and second end effectors 302 and 304 generate a vacuum to thereby achieve adherence to a wafer. A sensor (not shown) may be located at any suitable location on robot 300 to detect wafer size. Robot 300 thus may include a vacuum source (not shown). It will be appreciated, however, that one or more electrically-conductive coils may be substituted for the vacuum source and configured to produce an electrostatic charge to thereby produce a holding force securing a wafer to the end effectors. In one embodiment, an electric coil may be provided for each of first and second end effectors 302 and 304 and disposed in a region corresponding substantially to the dark circular regions toward the ends of each end effector.

FIG. 4 shows yet another exemplary wafer handling robot 400 in accordance with an embodiment of the present disclosure. Robot 400 includes a first end effector 402 and a second end effector 404 each configured to grip and support a wafer with a set of rear pads 410 and a set of front pads 411. First and second end effectors 402 and 404 each further include an inner blade 406 adapted to grip the outer edge of a wafer and an outer blade 408 adapted to grip the outer edge of a wafer. During operation, inner blade 406 and/or outer blade 408 of each end effector may move up or down to accommodate the varying wafer sizes being handled. In this way, a single end effector may handle more than one wafer size.

Returning to FIG. 1, wafer handling robot 104 may be robot 200, 300, or 400. It will be understood, however, that such wafer handling robots are provided as non-limiting examples. Other wafer handling mechanisms may be additionally or alternatively employed. For example, wafer handling robots may be provided which include electrically-operated grippers or electrostatic chucks. In the latter approach, robot hands may be configured to generate an electrostatic charge to thereby produce a holding force to secure a wafer to their surfaces, as described above. Further, wafer handling robots may be provided which rely on gravity to handle wafers. In this approach, robot hands may be configured to limit wafer movement via friction generated between a wafer and one or more blades of the robot hands, the friction generated due to gravitational forces. It will be also appreciated that additional wafer handling robots may be provided in wafer environment 100 without departing from the scope of this disclosure. Further, each robot may have a single hand or more than two hands, and each hand may have one or more blades, though the number of hands and blades may be limited by the number of included motors. In this way, a single wafer handling robot may be provided with the capability to handle multiple wafer sizes, reducing the cost and complexity in a wafer manufacturing process.

Robots 104, 200, 300, and 400 may be articulated robots. The robots may have one or more degrees of freedom, including translational and/or rotational degrees of freedom. For example, the robots may have a translational and a rotational degree of freedom in an x-y plane. The robots may further engage in any other suitable types of motion, including sinusoidal motion, and may implement a continuous path control scheme. The robots may be servo-controlled with a spatial accuracy and repeatability on the order of 1 mm or better. However, it will be appreciated that these capabilities and values are provided as non-limiting examples and that any suitable wafer handling robot may be provided in wafer environment 100.

Wafer handling robot 104 includes a controller 114 to facilitate a wafer handling process in which wafers are moved throughout the plurality of stations 102. Controller 114 is further configured to implement a wafer interlock protocol, described in further detail below with reference to FIG. 5.

Wafer environment 100 further includes a tool computer 116. Tool computer 116 is configured to receive user input and commands controlling the operation of wafer handling robot 104 and optionally one or more of stations 106, 108, 110, and 112. Input may be received via any suitable input device, for example keyboard 118. Tool computer 116 is further configured to output information in a suitable format (e.g., via a command line interface, graphical user interface, etc.) representative of the state of robot 104 and optionally one or more of stations 106, 108, 110, and 112. Such information may be outputted via any suitable device, for example display device 120. Tool computer 116 is shown as being operatively coupled to controller 114 to thereby control operation of wafer handling robot 104 and stations 106, 108, 110, and 112. Such coupling may be implemented by any suitable interface, for example an RS-232 serial or Ethernet connection.

Figure 5:
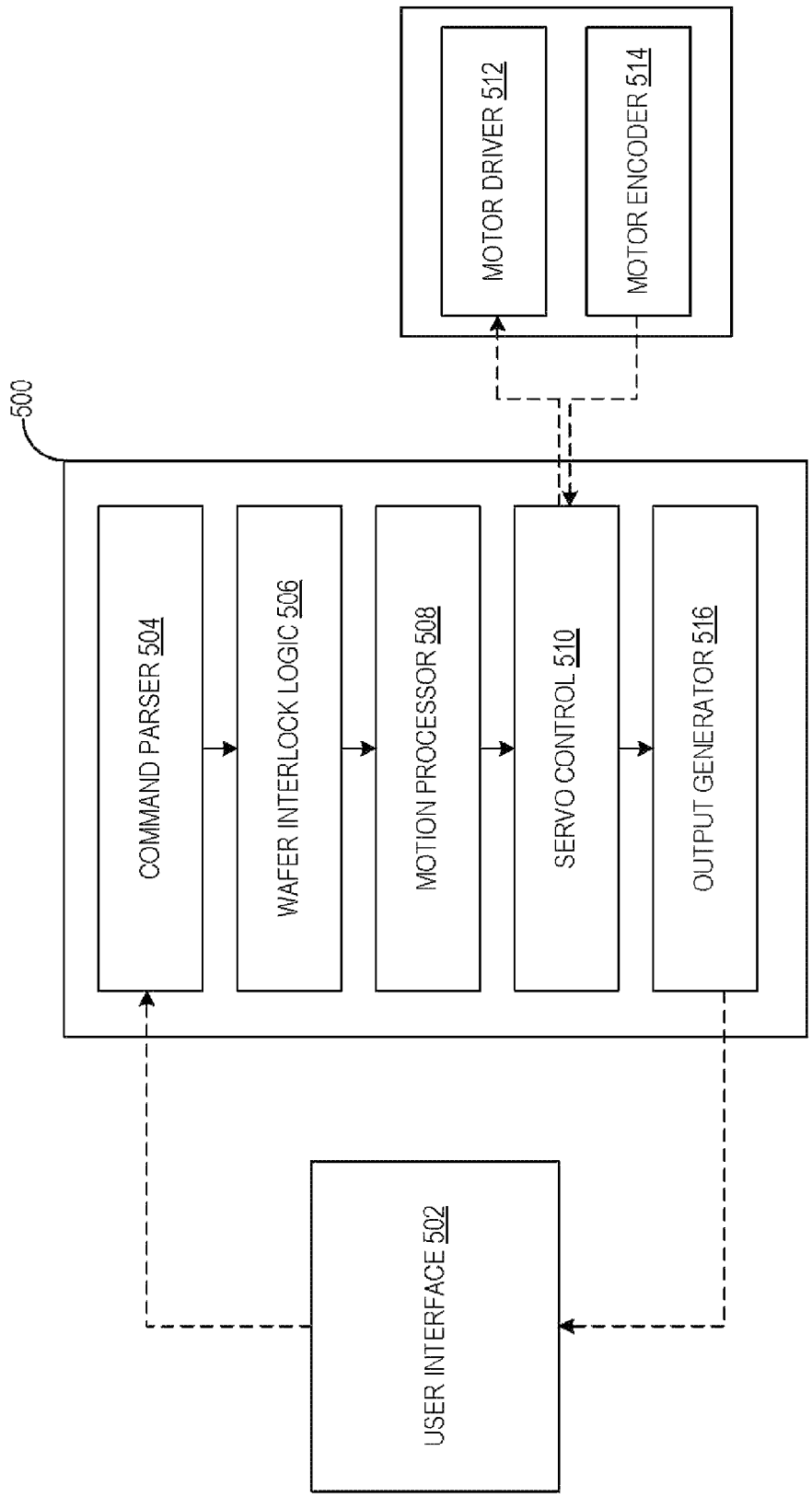
FIG. 5 schematically shows an exemplary controller in accordance with an embodiment of the present disclosure.

Turning, now to FIG. 5, an exemplary controller 500 in accordance with the present disclosure is shown. Controller 500 may control the operation and motion of the robots described above, including robots 104, 200, 300, and 400. Controller 500 may further be configured to implement a wafer interlock protocol, described in further detail below and with reference to FIGS. 6 and 7.

Controller 500 may receive user input and commands via a user interface 502. User interface 502 may be, for example, a command line interface or a graphical user interface configured to receive input and commands via user input. User input may be supplied via tool computer 116; for example a user may type into user interface 502 via keyboard 118 a "GET" command, commanding wafer handling robot 104 to obtain a wafer from a station. User interface 502 may be displayed via tool computer 116 and particularly by display device 120.

Controller 500 includes a command parser 504 configured to parse received input and commands. In some embodiments, command parser 504 may receive commands in ASCII plain text and interpret said commands to thereby execute the commands. In other embodiments, command parser 504 may receive commands and translate and/or break down the commands into lower level machine code.

Having been parsed at command parser 504, instructions may proceed as input to a wafer interlock logic 506. Before reaching wafer interlock logic 506, parsed instructions may be evaluated for proper syntax and that valid robots and wafer stations are specified. Wafer interlock logic 506 is configured to pass valid instructions through controller 500 (e.g. issue commands to a servo control 510) and suppress invalid instructions and generate relevant errors, which may be customized based on size parameters associated with the robots and stations specified in the command, as described in further detail below. In particular, wafer interlock logic 506 verifies that the size of a robot hand (e.g., first end effector 202) identified by an instruction is compatible with the source or destination station to/from which a wafer is being placed/obtained. For example, wafer interlock logic 506 suppress an instruction in which a robot hand adapted to handle 300 mm wafers is instructed to obtain a wafer from a source station which exclusively holds 450 mm wafers. A plurality of size parameters may be assigned to each robot hand and station in the wafer environment (e.g., the plurality of stations 102 in wafer environment 100) prior to operation, such that wafer interlock logic 506 will have adequate information to determine compatibility between a robot hand and station. Wafer interlock logic 506 may be configured to implement a wafer interlock protocol to determine such compatibility.

Figure 6:
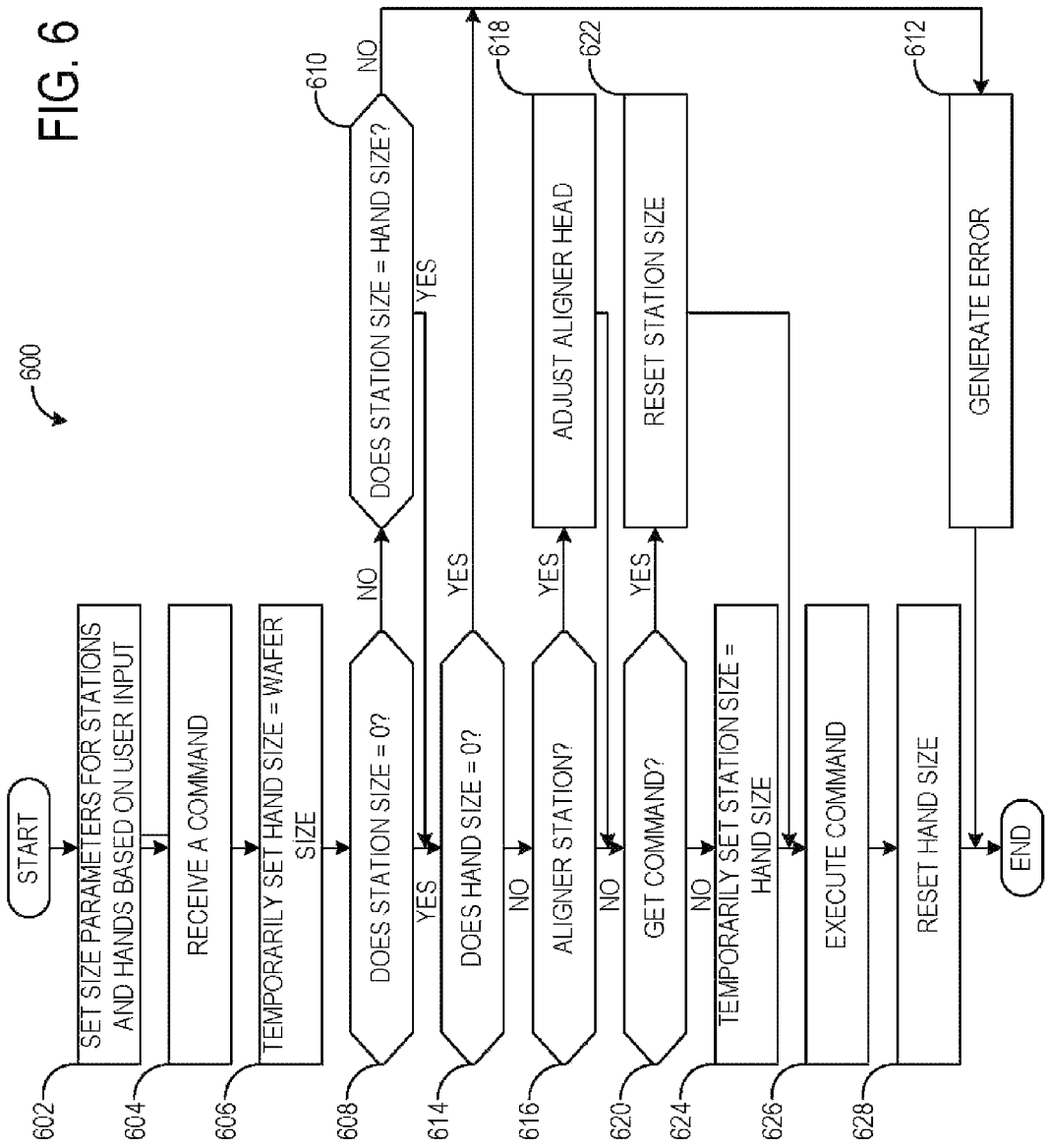
FIG. 6 shows a wafer interlock protocol in accordance with an embodiment of the present disclosure.

Turning now to FIG. 6, a wafer interlock protocol 600 is shown. Protocol 600 may be carried out, for example, by controllers 114 or 500. In this example, protocol 600 is implemented on controller 500 to provide an interlock among wafer handling robot 104, first source station 106, processing station 110, which in this example is an aligner station, and destination station 112. However, it will be appreciated that protocol 600 may be carried out to provide an interlock between any suitable number and types of robots and stations.

At 602 of protocol 600, size parameters for the plurality of stations 102 and wafer handling robot 104 are set based on user input. In some embodiments, size parameters are encoded with integers including 1 which encodes for a 300 mm handling capability, 2 which encodes for a 450 mm handling capability, and 0 which encodes for the capability of handling all wafer sizes, for example all wafer sizes present in wafer environment 100. In this example, 0 indicates that both 300 mm and 450 mm wafers may be handled. Further, robot 104 in this example includes two hands which each have associated therewith a size parameter such that each hand's handling capability is encoded and accessible. The size parameters may be set based on user input received via tool computer 116 at the beginning of a process run, for example. It will be appreciated, however, that any number of size parameters may be provided. Further, such size parameters may be encoded in any suitable fashion, including alphanumerically.

At 604, a command is received, which may also be received via tool computer 116 and may be issued to robot 104 and one or more stations in the plurality of stations 102. A plurality of commands may be issued to affect various aspects of wafer environment 100, and may be stored in a storage subsystem associated with controller 500 and/or tool computer 116. As described above, such commands may be translated and/or broken down into machine instructions. The commands may include a "GET" command executed to cause robot 104 to obtain a wafer from a station. The GET command may be issued, for example, toward the beginning of a process run at a point where a wafer is to be obtained from first source station 106 and transferred to processing station 110 for alignment. In some embodiments, the GET command requires specification of several parameters: the robot to which the instruction will be issued (particularly for embodiments in which multiple robots are included in wafer environment 100), the robot hand to be used, the station from which the wafer is to be obtained, and the slot of the station from which the wafer is to be obtained. As one non-limiting example, a GET command may have the following syntax: GET, robot 1, hand 1, station A, slot 1. This command instructs robot 1 to obtain a wafer from slot 1 of station A using hand 1.

Executable commands may also include a "PUT" command. In contrast to GET, PUT instructs a robot to place a wafer into a desired station. PUT commands may be issued after completion of a GET command. Like GET, PUT in some embodiments may require specification of several parameters: the robot to which the instruction will be issued (particularly for embodiments in which multiple robots are included in wafer environment 100), the robot hand to be used, the station to which the wafer is to be placed, and the slot of the station to which the wafer is to be placed. As one non-limiting example, a PUT command may have the following syntax: PUT, robot 1, hand 1, station C, slot 5. This command instructs robot 1 to place a wafer into slot 5 of station C using hand 1.

Executable commands may further include an "ALIGN" command. ALIGN may be specific to an aligner station and executed to align a wafer as described above to thereby determine a wafer's orientation.

As a non-limiting example in which processing station 110 in wafer environment 100 is an aligner station with one or more slots, the following instructions may be issued in the order shown to obtain a wafer from a source station A, align the wafer in an aligner station B, and place the wafer in a destination station C:

GET, robot 1, hand 1, station A, slot 1
PUT, robot 1, hand 1, station B, slot 1
ALIGN, station B
GET, robot 1, hand 1, station B, slot 1
PUT, robot 1, hand 1, station C, slot 5

Upon receiving a command such as a GET, PUT, or ALIGN command, at 606 the size parameter of the robot hand identified in the issued instruction is temporarily set to the wafer size being handled in the issued instruction. The wafer size being handled is determined based on the robot hand identified in the issued instruction. For example, if hand 1 is identified in the instruction and has an associated size parameter set at 602 of 1 (e.g., 300 mm), the wafer size is determined to be 300 mm as well. In such embodiments, wafer interlock protocol 600 thus requires that user input, including input on which the setting of size parameters is based, be correct. However, it will be appreciated that additional or alternative approaches are possible without departing from the scope of this disclosure in which specified wafer sizes are verified. For example, in some embodiments protocol 600 may verify wafer sizes based on output identifying wafer size received from an alignment station or the robot sensors located on the hand and/or blade.

At 608, it is determined whether or not the size parameter associated with the station identified by the issued command is equal to 0 (e.g., capable of handling both 300 mm and 450 mm wafers). If the size parameter is determined to not equal 0, protocol 600 proceeds to 610 where it is determined whether or not the size parameter associated with the identified station is equal to the size parameter associated with the robot hand in the issued instruction. If it is determined that such sizes are unequal, protocol 600 proceeds to 612 whereat an error is generated, preventing execution of the issued command. In some examples, the error may be a text string indicating the failure of a command, sent to tool computer 116 and outputted via display device 120. After issuance and successful completion of a PUT command, for example, the string "PUT command successful" may be generated and outputted such string to display device 120 of tool computer 116. The output may further be customized based on the particular parameters specified in a command. For example, in response to an unsuccessful PUT command of "PUT, robot 1, hand 1, station A, slot 1", the string "PUT command unsuccessful; hand 1 or slot 1 incompatible" may be generated. In this way, unsuccessful completion of a command may be followed with output of information identifying or at least narrowing a cause of the failure, expediting failure resolution and reducing wafer process downtime. Such output generation and customization may be carried out by output generator 516 in controller 500, for example.

In this way, wafers and equipment are protected from damage due to a size mismatch, based on user input received at 602 and 604. If, at 610, it is determined that the station size parameter is equal to the hand size parameter, or if at 608 it is determined that the station size parameter is equal to 0, protocol 600 proceeds to 614.

At 614, it is determined whether or not the size parameter associated with the robot hand is equal to zero (e.g., capable of handling 300 mm and 450 mm wafers). If it is determined that the robot hand size parameter is equal to zero, protocol 600 proceeds to 612 whereat the error is generated. If it is instead determined that the robot hand size parameter is not equal to zero, protocol 600 proceeds to 616.

At 616, it is determined whether or not the station identified in the issued instruction is an aligner station. If the station is an aligner station, protocol 600 proceeds to 618 whereat an aligner head associated with the aligner station is moved based on the determined wafer size, as described above. In this way, errors and/or damage due to misalignment of the aligner head may be avoided. After aligning the aligner head, or if at 616 it is determined that the identified station is not an aligner station, protocol 600 proceeds to 620.

At 620, it is determined whether or not the issued instruction is a GET command. If the issued instruction is a GET command, protocol 600 proceeds to 622 whereat the size parameter associated with the identified is reset to its original value set at 602. Protocol 600 then proceeds to 626. If instead it is determined at 620 that the issued instruction is not a GET command (e.g., PUT, ALIGN), protocol 600 proceeds to 624 whereat the size parameter associated with the identified station is temporarily set to the current size parameter associated with the identified robot hand. Temporarily setting the size parameter to the hand size parameter provides another level of automatic protection to wafers and wafer handling robots in a wafer processing environment. However, it may be that subsequent commands must specify the correct robot hand size (e.g., either 1-300 mm or 2-450 mm). In some embodiments, the size parameter associated with the identified station is temporarily set to the current size parameter associated with the identified robot hand if the size parameter associated with the identified station is an all-size parameter (e.g., 0). Protocol 600 then proceeds to 626.

At 626, the issued instruction is executed. For example, if the issued instruction is a GET command, a wafer is obtained from the identified location using the identified robot and hand.

Finally, at 628, the size parameter associated with the identified hand is reset to its original value set at 602.

Figure 7:
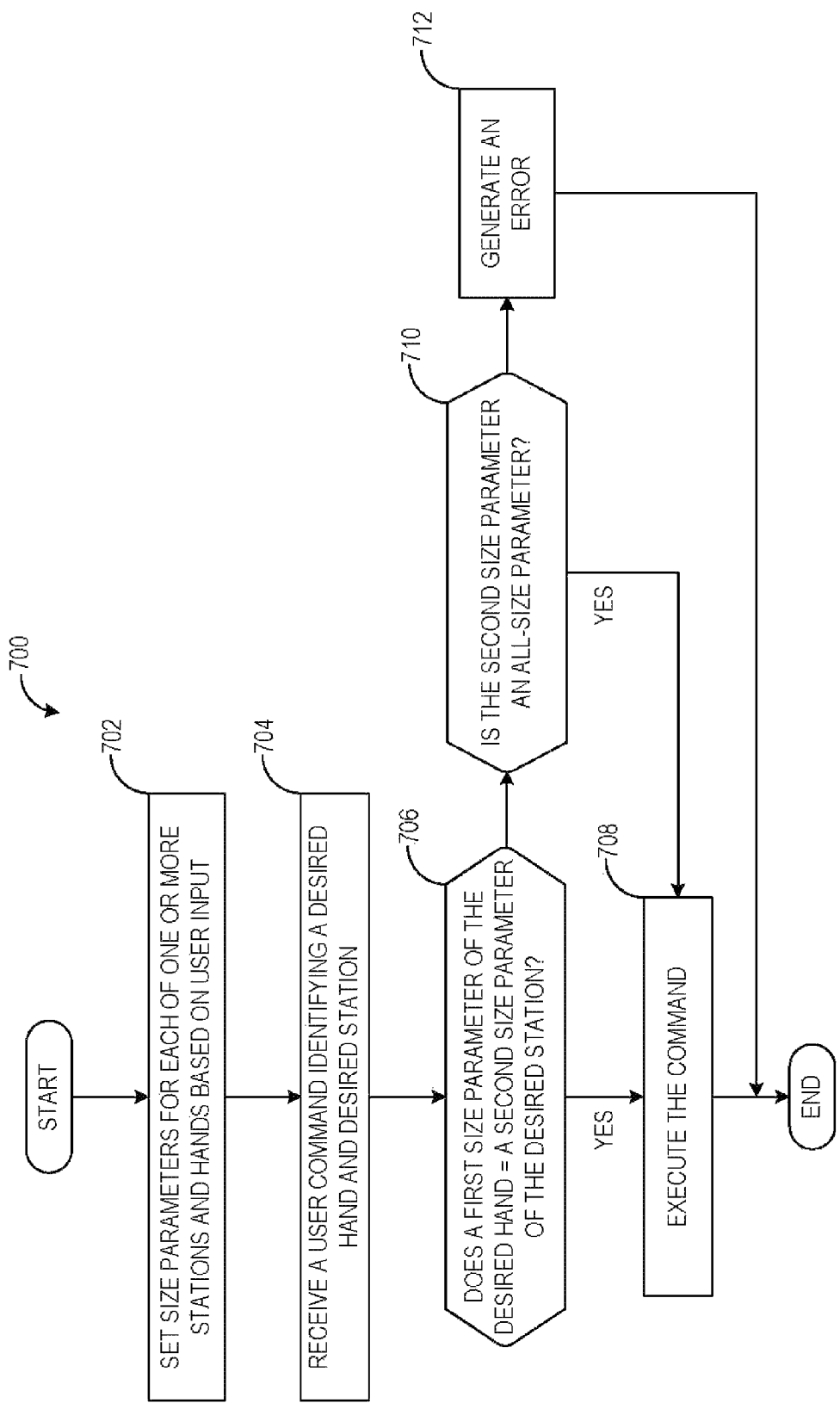
FIG. 7 shows a second wafer interlock protocol in accordance with an embodiment of the present disclosure.

It will be appreciated that protocol 600 is provided as a non-limiting example and that controller 500, and wafer interlock logic 506, may be configured to implement alternative or additional wafer interlock protocols. Turning now to FIG. 7, an alternative wafer interlock protocol 700 is shown which may be carried out, for example, by controllers 114 or 500. Protocol 700 may provide a higher-level interlock for a wafer environment, and may be appropriate, for example, for less complex wafer environments having fewer stations. Alternatively or additionally, protocol 700 may be implemented, for example, for a wafer handling robot at a particular and less complex stage of an overall greater wafer manufacturing process.

At 702 of protocol 700, size parameters for each of one or more stations and robot hands in a wafer environment are set. The size parameters may encode the wafer size handling capabilities of each station and robot hand. The size parameters may be encoded in any suitable manner, including the integer encoding described above. The size parameters may be received based on user input, received for example from tool computer 116.

At 704, a user command is received identifying an instruction (e.g., GET, PUT, etc.), a robot hand to be used to carry out the instruction and move a wafer, and a station to/from which the wafer is to be placed/obtained, as described above with reference to protocol 600. For example, the following GET command may be received: GET, robot 1 hand 1, station A, slot 1. This command instructs robot 1 to obtain a wafer from slot 1 of station A using hand 1.

At 706, it is determined whether or not a first size parameter associated with a desired hand is equal to a second size parameter associated with a desired station. The first size parameter may be set at 702 based on user input and is associated with a desired hand identified in the user command received at 704, which in the above example is hand 1. The second size parameter may also be set at 702 based on user input and is associated with a desired station identified in the user command received at 704, which in the above example is station A. Thus, protocol 700 provides an interlock determining whether the size handling capabilities of a robot hand and station are compatible. If it is determined that the first size parameter is equal to the second size parameter, protocol 700 proceeds to 708 where the command received at 704 is executed. If, however, it is determined that the first size parameter is not equal to the second size parameter, protocol 700 proceeds to 710.

At 710, it is determined whether or not the second size parameter associated with the desired station is an all-size parameter. In other words, at 710 it is determined if the station identified at 704 is capable of handling all wafer sizes. For example, an identified station may be determined to have an associated all-size parameter if its associated parameter has a value of 0, encoding for the capability of handling all sizes. If the second size parameter is an all-size parameter, protocol 700 proceeds to 708 where the command received at 704 is executed. In this way, protocol 700 allows for a quick check of wafer handling capabilities and allows the execution of a command in which a station capable of handling all wafer sizes is identified. As a result, successful execution of the command as desired depends on the identified robot hand being capable of handling an instant wafer. Additional action may be taken to perform such a check, or protocol 700 may depend on the correctness of user input. If instead it is determined that the second size parameter is not an all-size parameter, protocol 700 proceeds to 712 where an error is generated as described above and below with reference to output generator 516 of controller 500.

At this point, it has been determined that the wafer handling capabilities of an identified hand and station are incompatible and the command will be suppressed to prevent errors and damage. At 712, an error may be generated and outputted, for example, to display device 120 of tool computer 116, as described above.

Turning now to FIG. 8, wafer interlock logic 506 may alternatively or additionally access a truth table 800 to thereby determine compatibility of wafer handling capabilities. It will be understood that table 800 is provided as a non-limiting example and that it may be expanded or altered to accommodate other wafer sizes, station slot sizes, and varying numbers of wafer sizes, stations, robots, and hands. Table 800 may be stored in controller 500 in some embodiments. In this example, table 800 stores size parameters for the stations, robots, and hands in a wafer environment (e.g., wafer environment 100). Upon receiving a command, for example from command parser 504, wafer interlock logic 506 may access table 800 and find the entry indicating compatibility based on the size parameters specified in the command. For example, wafer interlock logic 506 may receive the command "GET, robot 1, hand 1, station A". A column 802 may be accessed, its size parameter corresponding to the hand size parameter specified in the command (1, or 300 mm). A row 804 may then be accessed, its size parameter corresponding to the size parameter of the station specified in the command, the station size parameter determined, for example, at 602 of protocol 600 or at 702 of protocol 700. In this example, the station size parameter was set to 1 (300 mm), causing access to row 804. Having identified column 802 and row 804, a corresponding cell 806 is accessed to determine the compatibility of the robot's hand's size handling capability and the station's size handling capability. Cell 806 holds the parameter "Y", indicating that the two size parameters are compatible. The command may then be executed as described above.

Returning to FIG. 5, controller 500 may include additional components configured to implement processes in wafer environment 100. Controller 500 may include a motion processor 508 configured to perform various calculations accessible by controller 500 to carry out robot motion. Motion processor 508 may, for example, compute hand positions necessary for the successful execution of an issued and parsed command and in some embodiments, may implement a continuous path control scheme. The output of motion processor 508 may be encoded in any suitable format.

A servo control 510 may receive output from motion processor 508 for the actuation of various components of a robot (e.g., one or more motors of wafer handling robot 104). Servo control 510 may further process and transform received input to a format appropriate for a motor driver 512, operatively coupled to servo control 510 and configured to carry out robot motion. Servo control 510 may then send input to motor driver 512 to thereby carry out robot motion. Motor driver 512 may actuate one or more motors in a robot based on input received from servo control 510. Servo control 510 is also operatively coupled to and configured to receive output from a motor encoder 514, configured to sense and encode the positions of the one or more motors. The sensed and encoded positions may be sent to servo control 510 to thereby report the outcome of an issued command.

Controller 500 further includes an output generator 516 configured to generate output representative of one or more aspects of wafer environment 100. For example, output generator 516 may receive input from servo control 510 to thereby determine whether or not a received command was successful. In some embodiments, output generator 516 may generate and output text strings indicating the success or failure of a command. After issuance and successful completion of a GET command, for example, output generator 516 may generate the string "GET command successful" and output such string to display device 120 of tool computer 116. Output generator 516 may be further configured to customize output based on the particular parameters specified in a command. For example, in response to an unsuccessful GET command of "GET, robot 1, hand 1, station A, slot 1", output generator 516 may generate the string "GET command unsuccessful; hand 1 or slot 1 incompatible". In this way, unsuccessful completion of a command may be followed with output of information identifying or at least narrowing a cause of the failure, expediting failure resolution and reducing wafer process downtime. Output generator 516 may further associate error codes with an error.

It will be appreciated that the above protocols and methods are non-limiting examples and that steps may be added, removed, and reordered without departing from the scope of this disclosure. Further, the controllers described herein are also non-limiting examples which may include more or less components than those shown in the illustrated embodiments. It will be understood that such controllers may be discrete controllers operatively coupled to wafer handling robots, wafer stations, and/or tool computers. Alternatively or additionally, such controllers may be integrated within robots, stations, and/or tool computers. Further still, a tool computer (e.g., tool computer 116) may implement the functionalities of controllers 114 and/or 500 described above.

It is to be understood that the configurations and/or approaches described herein are exemplary in nature, and that these specific embodiments or examples are not to be considered in a limiting sense, because numerous variations are possible. The embodiments described above and the embodiments illustrated in the drawings serve as examples of the variety of different devices. The subject matter of the present disclosure includes all novel and nonobvious combinations and subcombinations of the various configurations, features, functions, and/or properties disclosed herein, as well as any and all equivalents thereof.

The invention claimed is:

1. A method for handling multiple wafer sizes with one or more wafer stations and a wafer handling robot having one or more robot hands, the method comprising:
setting size parameters for each of the one or more wafer stations and the one or more robot hands based on user input;
receiving a user command identifying a desired robot hand and a desired wafer station;
comparing a first size parameter of the desired robot hand to a second size parameter of the desired wafer station;
if the first size parameter is equal to the second size parameter, or if the second size parameter is an all-size parameter, executing the user command; and
if the first size parameter is not equal to the second size parameter, generating an error message.

2. The method of claim 1, wherein the multiple wafer sizes include at least 350 millimeter and 450 millimeter sizes.

3. The method of claim 1, further comprising determining a rotational orientation of a wafer at an aligner station.

4. The method of claim 3, further comprising automatically moving an aligner head based on a size of the wafer prior to transfer of the wafer to a processing station.

5. The method of claim 1, further comprising customizing the error message based on one or more parameters in the user command to thereby identify a source of the error.

6. The method of claim 1, further comprising accessing a truth table to thereby determine size parameter compatibility.

7. The method of claim 1, further comprising temporarily setting the second size parameter equal to the first size parameter if the second size parameter is the all-size parameter.

8. A system for handling multiple wafer sizes, comprising:
one or more wafer stations;
a wafer handling robot having one or more robot hands configured to handle semiconductor wafers; and
a controller operatively coupled to the wafer handling robot, the controller comprising:
a command parser configured to receive and parse user input from a tool computer operatively coupled to the controller;
a wafer interlock logic configured to:
set size parameters for each of the one or more wafer stations and the one or more robot hands based on the user input;
compare a first size parameter of a desired hand to a second size parameter of a desired wafer station, the desired hand and desired wafer station specified by the user input;
if the first size parameter is equal to the second size parameter, or if the second size parameter is an all-size parameter, issue a command; and
if the first size parameter is not equal to the second size parameter, generate an error;
a motion processor configured to compute hand positions to thereby carry out motion; and
an output generator configured to generate output indicating success or failure of the command.

9. The system of claim 8, wherein the multiple wafer sizes include at least 350 millimeter and 450 millimeter sizes.

10. The system of claim 9, wherein the wafer handling robot has a hand configured to handle at least 350 millimeter and 450 millimeter sizes.

11. The method of claim 8, further comprising:
an aligner station including:
an aligner head;
a light source configured to project light in a substantially perpendicular direction to a wafer surface; and
a detector configured to detect light passing through a wafer notch to thereby determine a rotational orientation of a wafer.

12. The system of claim 8, the tool computer further comprising:
an input device configured to receive user input and commands; and
a display device configured to display information representative of a state of the wafer handling robot.

13. The system of claim 12, wherein the display device is configured to display a command line interface.

14. The system of claim 8, the controller further comprising a servo control configured to send input to a motor driver to thereby carry out robot motion.

15. The system of claim 12, wherein the servo control is further configured to receive output from a motor encoder configured to sense one or more robot motor positions.

16. The system of claim 8, the controller further comprising a truth table accessible to determine wafer handling compatibility.

17. The system of claim 8, wherein the one or more robot hands include grippers configured to push against an outer edge of a wafer or pockets configured to limit wafer movement.

18. The system of claim 8, wherein the one or more robot hands are configured to generate a vacuum to thereby achieve adherence to a wafer surface.

19. The system of claim 8, wherein the one or more robot hands are configured to generate an electrostatic charge to thereby produce a holding force to secure a wafer.

20. The system of claim 8, wherein the one or more robot hands are configured to limit wafer movement by friction generated between a wafer and a robot blade due to gravitational forces.

21. The system of claim 8, wherein the size parameters are encoded with integers.

22. A system for handling multiple wafer sizes, comprising:
  one or more wafer stations including an aligner station;
  a wafer handling robot having one or more hands configured to handle semiconductor wafers of at least 300 millimeter and 450 millimeter sizes;
  a tool computer configured to receive user input and display information representative of a state of the wafer handling robot; and
  a controller operatively coupled to the wafer handling robot, the controller comprising:
    a command parser configured to receive and parse user input from the tool computer operatively coupled to the controller;
    a wafer interlock logic configured to:
      set size parameters for each of the one or more wafer stations and the one or more hands based on the user input, the size parameters encoded with integers;
      compare a first size parameter of a desired hand to a second size parameter of a desired wafer station, the desired hand and desired wafer station specified by the user input;
      if the first size parameter is equal to the second size parameter, or if the second size parameter is an all-size parameter, issue a command; and
      if the first size parameter is not equal to the second size parameter, generate an error;
    a motion processor configured to compute hand positions;
    a servo control configured to send input to a motor driver to thereby carry out motion and receive output from a motor encoder configured to sense one or more motor positions; and
    an output generator configured to generate output indicating success or failure of the command.

* * * * *